United States Patent [19]

Webber et al.

[11] 3,941,007
[45] Mar. 2, 1976

[54] CONTROL SYSTEM FOR SHIFTING A DRIVE TRANSMISSION

[75] Inventors: Philip S. Webber, Morton; Maurice F. Franz, East Peoria, both of Ill.

[73] Assignee: Caterpillar Tractor Co., Peoria, Ill.

[22] Filed: Mar. 18, 1974

[21] Appl. No.: 452,116

[52] U.S. Cl. .................. 74/340; 74/346; 192/3.57; 192/4 A; 192/12 C
[51] Int. Cl.[2] ..................... F16D 67/00; G01K 1/00
[58] Field of Search..................... 74/340; 192/4 A

[56] References Cited
UNITED STATES PATENTS

| | | | |
|---|---|---|---|
| 3,508,450 | 4/1970 | Richards | 74/340 |
| 3,570,636 | 3/1971 | Franz et al. | 192/3.57 |
| 3,667,309 | 6/1972 | Franz et al. | 192/4 A X |

*Primary Examiner*—Benjamin W. Wyche
*Attorney, Agent, or Firm*—Phillips, Moore, Weissenberger Lempio & Strabala

[57] ABSTRACT

Pneumatically operated devices respond to movement of a shift lever by decoupling change speed gears from both the input and output of a transmission and then brake the gears to a stop, shift gear engagements as necessary, release the brakes and re-engage the input and output clutches to re-establish drive at a newly selected drive ratio. A self-cycling control circuit is connected between the shift lever and pneumatic devices to actuate and deactuate such devices as necessary to accomplish a selected shift. The circuit includes means which enables re-engagement of the input and output clutches only after critical gear couplings and decouplings are established together with means which cycles the gears to facilitate engagements and disengagements if these have not occurred in a predetermined time. Means are also provided for preconditioning the system to respond quickly to a subsequent shift lever movement.

12 Claims, 8 Drawing Figures

Fig_1_

Fig_2D_

FIG_2A_

Fig-2B

| SPEED RATIO | PRESSURIZED PILOT SIGNAL LINES | | | | | |
|---|---|---|---|---|---|---|
| | 61a | 91 | 61d | 61ℓ | 139 | 103 |
| 16 | | | | | | |
| 15 | | | X | | | |
| 14 | X | | | | | |
| 13 | X | | X | | | |
| 12 | | X | | | | |
| 11 | | X | X | | | |
| 10 | X | X | | | | |
| 9 | X | X | X | | | |
| 8 | | | | X | | |
| 7 | | | X | X | | |
| 6 | X | | | X | | |
| 5 | X | | X | X | | |
| 4 | | X | | X | | |
| 3 | | X | X | X | | |
| 2 | X | X | | X | | |
| 1 | X | X | X | X | | |
| N | X | | X | X | X | |
| R₁ | X | | X | X | | X |
| R₂ | | | X | X | | X |

CONTROL SYSTEM FOR SHIFTING A DRIVE TRANSMISSION

BACKGROUND OF THE INVENTION

This invention relates to multi-speed drive transmissions for vehicles or the like and more particularly to fluid operated control systems for shifting transmissions between drive ratios in response to movement of an operator's shift lever or the like.

Prior U.S. Pat. No. 3,508,450 discloses a highly advantageous form of transmission in which a shift is effected by disconnecting the internal change speed gears from both the driving engine and the wheel drive line of the vehicle and then temporarily braking the gears to a stationary or near stationary condition so that disengagements and re-engagements are readily accomplished without requiring synchronizers or the like. After re-engagement of the gears to establish a newly selected drive ratio, the brakes are released and input and output clutches re-engage to re-establish drive through the transmission. Another prior U.S. Pat. No. 3,570,636 describes a fluid circuit for automatically cycling the various pneumatic devices in a transmission of this kind to accomplish a selected shift.

Utilizing the control system of prior U.S. Pat. No. 3,570,636, the operator need only move the shift lever from one position to another to effect a shift. The necessary timed actuations and de-actuations of the several pneumatic devices including input and output clutches are then sequenced automatically by the control system. The structures of the above-identified prior U.S. patents combine the compactness, economy and basic efficiency of so-called standard or manual transmissions with the superior shifting performance and much of the ease of control of so-called automatic transmissions. In addition, the absence of synchronizers enables realization of a large number of drive ratios in a transmission having a small number of change speed gears.

Another prior U.S. Pat. No. 3,667,309 discloses an improved transmission of the general type discussed above in conjunction with an improved pneumatic control system. In the structure of prior U.S. Pat. No. 3,667,309, braking of the change speed gears at the start of the shift is accomplished with brakes that stop rotation of the input and output elements of the gearing section. At the conclusion of the shift, the input brake is released slightly in advance of release of the output brake so that any gear teeth which have failed to engage because of tooth abutment are enabled to engage while turning at low speed and under light loading. Other advantageous improvements to transmissions of this general type and to control systems therefor are described in prior U.S. Pat. Nos. 3,667,583; 3,620,097; 3,570,541; 3,744,608; co-pending application Ser. No. 369,714 of Kenneth R. Moline et al, filed June 13, 1973 now U.S. Pat. No. 3,863,520; and co-pending application Ser. No. 372,331, of Philip S. Webber et al filed June 21, 1973, all assigned to the assignee of the present application.

In shifting a transmission of the general type discussed above, there is a possibility that change speed gears which are to be engaged may come to rest in a position at which gear teeth to be engaged are abutted and engagement is temporarily blocked. Certain of the above-identified patents teach means for resolving this problem by transmitting a limited torque to the gears, to bring teeth into the necessary relationship for engagement, prior to the re-establishment of drive through the transmission. While this is generally effective for the desired purpose, full torque is applied to the gears after a predetermined time and severe tooth wear from skating or grinding can then occur if the desired engagements have not been completed for some reason.

Considering still another characteristic of prior transmissions of this kind, the shift control system must undergo certain preliminary changes to be in condition for a shift cycle. For example, a lock which inhibits movement of the operator's shift lever between drive ratio positions must release. As heretofore constructed, this lock has not released the shift lever for movement to another drive ratio setting and certain other conditioning operations have not been initiated until the operator made a small sideward movement of the lever prior to movement to a new drive ratio setting. A period of time is required to release the lever and for the control system to condition itself for shift. During this period the operator cannot complete the control lever movement necessary for the initiating of the shift. While this delay is small, typically a fraction of a second, it is disturbing to the operator and has an appreciable effect on the operation of the transmission. Power is not delivered to the vehicle wheels during the shift period. Any prolongation of the shift period results in a loss of engine output which would otherwise be available to do useful work.

Considering still another characteristic of prior transmission of this general form, a high risk of component damage is present if gear couplings required to disengage in a directional shift, i.e., from forward drive to reverse drive or vice versa, should fail to disengage for some reason such as torque locking. At the conclusion of such a shift certain portions of the gearing system might then be attempting to transmit drive in a forward direction while others are attempting to transmit torque in a reverse direction. Prior transmissions and control systems have not included any fully reliable and positive means for guarding against such an occurrence.

SUMMARY OF THE INVENTION

This invention provides a control system for shifting a transmission of the kind described above in response to a simple movement of an operator's control lever or the like wherein the change speed gears are isolated from high torque forces at the conclusion of a shift until necessary new gear engagements have been completed.

In a preferred form of the invention, the change speed gears are also held isolated from high torque forces in the event that gear couplings involved in a directional shift failed to disengage as required. If the re-establishment of drive through the transmission is delayed beyond a normal period for the foregoing reasons, the preferred system accelerates the gears while in the isolated condition to enable the necessary engagements and disengagements to take place. Also in a preferred form of the invention, the period required for a shift is reduced by means which precondition the control system for a subsequent shift in advance of any movement of the operator's control lever.

Accordingly, it is an object of this invention to reduce wear and the risk of damage to components of a transmission of the form wherein change speed gears are isolated and braked to a stationary or near stationary condition for the purpose of shifting gear engagements. It is a further object of this invention to reduce the time required for shifting a transmission of the form described above.

The invention, together with further objects and advantages thereof, will best be understood by reference to the following description of a preferred embodiment taken in conjunction with the accompanying drawings.

DESCRIPTION OF A PREFERRED EMBODIMENT

Figure 1:
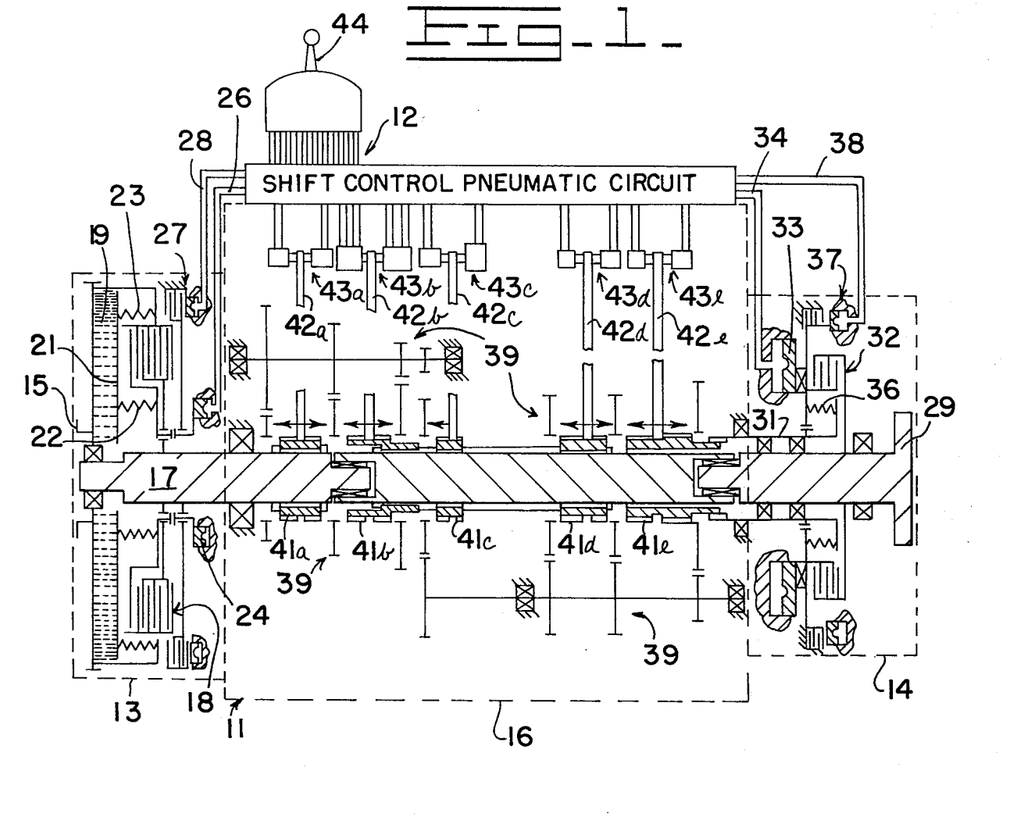
FIG. 1 is a schematic diagram of a typical transmission to which the invention may be applied and shows a control system of present invention connected therewith, FIGS. 2A, 2B and 2C, which may be juxtaposed as illustrated in FIG. 2D, jointly constitute a fluid circuit diagram illustrating a preferred embodiment of the control system of the present invention.

Referring initially to FIG. 1 of the drawings, there is shown a vehicle transmission 11 of the form to which the control system 12 of the present invention may advantageously be applied. The transmission 11 may be of known form such as is described in prior U.S. Pat. Nos. 3,570,636, and 3,667,309 for example, and therefore will be herein described only briefly to the extent necessary to understand the co-action of the control circuit 12 with the transmission.

A transmission 11 of this form has three principal sections including an input section 13, an output section 14 and a change speed gear section 16. Input section 13 includes a rotatable input member 15 which may be coupled to a driving engine and a rotatable intermediate shaft 17 which also extends into the change speed gear section 16. An input clutch 18 may be engaged to transmit power from the input member 15 to shaft 17 and is self-controlled for this purpose. In particular, a pressure tending to engage the input clutch 18 is generated by a volume of oil 19 which rotates with the input member 15 and therefore generates a centrifugal force within the oil volume which is proportional to input speed. The centrifugally generated force creates a fluid pressure acting on a movable plate 21 and through engagement springs 22 exerts a pressure tending to engage clutch 18. Disengagement springs 23 act between plate 21 and the input clutch 18 in a direction tending to disengage the clutch. Accordingly, the input clutch 18 undergoes a self-modulated engagement as input speed increases above engine idling speed and the rising centrifugal pressure within oil volume 19 acts to increase the force tending to engage the clutch. Clutch 18 automatically disengages when the input speed drops below a predetermined low value and disengagement springs 23 are able to overcome the forces tending to engage the clutch.

Input clutch 18 may be forcibly disengaged for the purpose of shifting speed ratios, without regard to the pressure exerted by rotating oil volume 19, by application of pressurized air from control system 12 to a piston 24 through a control conduit 26. Rotation of the intermediate shaft 17 may then be stopped, to facilitate gear shifting by application of pressurized air to an input brake 27 through another control conduit 28.

Output section 14 in this example has a rotatable output member 29 which may be coupled to the wheel drive line of a vehicle and has a rotatable shaft 31 which extends into the change speed gear section 16 to receive power therefrom. An output clutch 32 may be engaged, to couple output member 29 to shaft 31, by application of pressurized air to a piston 33 through a control conduit 34, a spring 36 being provided to disengage the clutch in the absence of air pressure behind the piston. With output clutch 32 disengaged, rotation of shaft 31 may be stopped by application of pressurized air to an output brake 37 through a control conduit 38. Thus the change speed gear section may be isolated from both the driving engine and the driven mechanism and rotating elements of the gear section may be forcibly stopped.

The change speed gear section 16 may be of the form disclosed in prior U.S. Pat. No. 3,667,309 and in still more detail in prior U.S. Pat. No. 3,508,450. Such a gear section has a plurality of change speed or ratio gears 39 which may be coupled in different ways by shifting a series of clutch collars 41 to establish any selected one of a plurality of drive ratios between shaft 17 and shaft 31. In this particular gear section 16, any one of sixteen forward speeds, neutral or two reverse speeds may be established by shifting appropriate combinations of the five clutch collars 41a to 41e as described in prior U.S. Pat. No. 3,508,450. Each such clutch collar 41 is shiftable in an axial direction through an associated separate one of five shift forks 42a to 42e which are in turn operated by an associated individual one of five pneumatic actuators 43a to 43e respectively. Actuators 43 are operated by the fluid circuit of control system 12 as will hereinafter be described in more detail.

Accordingly, a shift in the transmission between speed ratios in response to movement of an operator's control lever 44, may be accomplished by applying pressurized air to input clutch piston 24 while releasing pressurized air from output clutch piston 33 to isolate the change speed gear section 16 from both the driving engine and the driven mechanism, then applying pressurized air to the input brake 27 and output brake 37 to stop rotation of the change speed gears 39 and shift collars 41, then applying pressurized air to appropriate ones of the shift fork actuators 43 while exhausting pressurized air from others thereof, then releasing pressurized air from the input and output brakes 27 and 37 and exhausting pressurized air from behind input clutch piston 24 while transmitting pressurized air to output clutch piston 33 to re-connect the change speed gear section 16 into the power path between the driving engine and driven mechanism at the changed speed ratio. The shift control system 12 generates and times pressurized air signals for this purpose.

Figure 3:
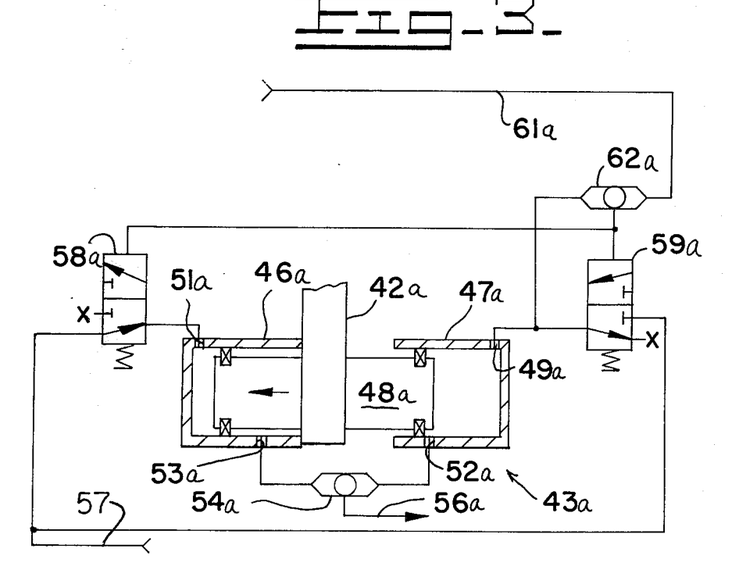
FIG. 3 illustrates the construction of certain shift fork actuators operated by the control system.

The control system can best be understood by first considering the structure of the several shift fork actuators 43. Actuators 43a, 43d, and 43e may all have a similar structure in this example of the invention as illustrated in FIG. 3 which depicts actuator 43a in particular.

Actuator 43a has a pair of opposed spaced apart co-axial cylinders 46a and 47a. The associated shift fork 42a extends into the gap between the two cylinders 46a and 47a and is coupled to a piston 48a that extends into each of the two cylinders and is movable in an axial direction relative thereto. A port 49a in cylinder 47a provides for the admission of pressurized air to drive piston 48a towards a first position at which shift fork 42a is abutted against the end of the other cylinder 46a. Similarly, a port 51a provides for the admission of pressurized air to cylinder 46a to drive the piston 48a in an opposite direction to abut the shift fork 42a against the end of the other cylinder 47a. An important advantage of the present invention is that change speed gearing is not re-coupled to the driving engine and driven mechanism until all desired gear engagements have been completed. To provide a signal indicating that the shift fork 42a has substantially completed travel across the gap between the two cylinders 46a and 47a, indicating that the gear engagement performed by that movement has been completed, a sensing port 52a is situated in the wall of cylinder 47a at a position to be exposed to the pressurized air within the cylinder only after the piston 48a has substantially completed the travel resulting from such pressurizing of cylinder 47a. Similarly, a sensing port 53a is provided in a similar position in the wall of cylinder 46a to receive a pressure signal only when the piston 48a has substantially completed travel resulting from pressurization of the other cylinder 46a. A double check valve 54a provides for transmitting the sensing signal from either port 52a or 53a to a sensing signal line 56a while blocking any direct interchange of pressure between the two sensing ports.

Pressurized air for shifting the actuator 43a in either direction is received through an actuator supply line 57 which communicates with port 51a through a two position pilot operated valve 58a and with port 49a through another two position pilot operated valve 59a. In the unpiloted condition, valve 58a communicates the actuator supply line 57 with port 51a. While in the unpiloted condition, valve 59a vents port 49a. If both valves 58a and 59a are unpiloted, piston 48a is shifted to abut shift fork 42a against cylinder 47a. To shift the piston 48a in the opposite direction, to the position depicted in FIG. 3, a pilot line 61a is momentarily pressurized. Pilot line 61a communicates with the pilots of both valves 58a and 59a through a double check valve 62a which also receives pressure from port 49a. If a brief pressure signal is received through pilot line 61a, both valves 58a and 59 a are piloted to the alternate positions. Upon being piloted, valve 58a vents port 51a while the piloting of valve 59a transmits pressure to port 49a thereby causing the piston 48a to shift to the position depicted in FIG. 3. Once valve 59a has been piloted in this manner to pressure port 49a, check valve 62a acts to continue transmitting pressure to the pilots of both valves 58a and 59a after the original pilot signal on line 61a is terminated. Accordingly, the actuator 43a is held at the shifted position until such time as the actuator supply line 57 may itself be vented. Thus, pressurization of supply line 57 without concurrent pressurization of pilot line 61a causes the actuator 43a to shift to the right as viewed in FIG. 3 while the actuator may be shifted in the opposite direction by pressurizing line 61a while the supply line 57 is pressurized. At the completion of a shift in either direction an engagement sensing pressure signal is transmitted to sensing line 56a.

Figure 4:
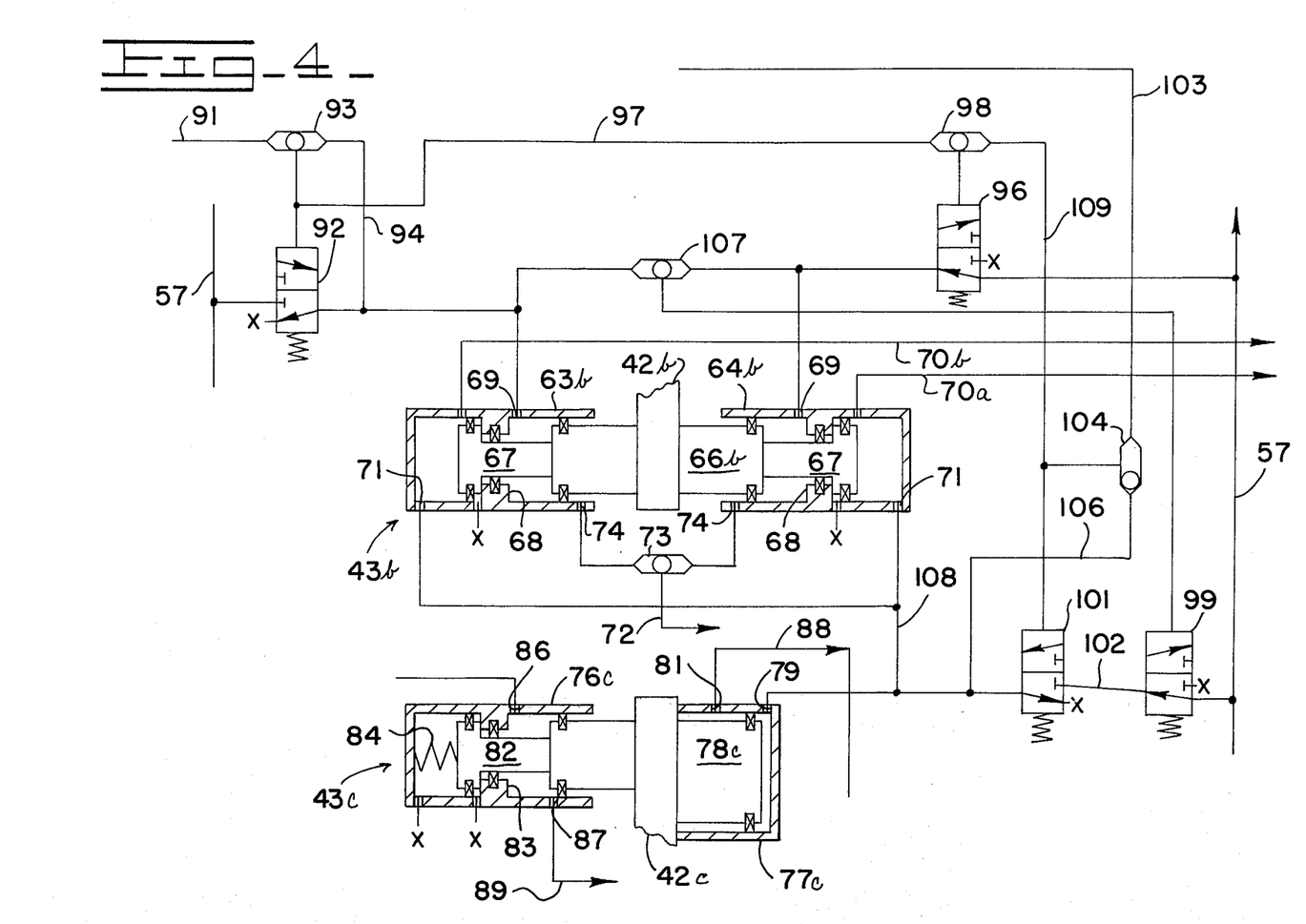
FIG. 4 illustrates the construction of certain other shift fork actuators operated by the control system.

Referring now to FIG. 4, actuators 43b and 43c have a differing configuration, as certain additional functions are performed by such actuators. Actuator 43b if shifted to either extreme position establishes forward drive and may also be shifted to an intermediate position at which no forward drive exists. Shifting of actuator 43c to one extreme position establishes reverse drive while shifting to the other extreme position disconnects reverse. To assure against possible damage which could result if both actuators should be shifted to a drive establishing position at the same time, an interlock action is provided to positively prevent such an occurrence. The interlock action provides for shifting of forward drive actuator 43b to the intermediate position when the reverse actuator 43c is shifted to establish reverse drive and also isolates either of such actuators from the pressurized air supply whenever the other of such actuators is shifted to effect a gear engagement.

For this purpose, actuator 43b has a pair of spaced apart co-axial cylinders 63b and 64b and a primary piston 66b extends into each of the cylinders and across the gap therebetween, the associated shift fork 42b being secured to the central portion of the piston. Cylinders 63b and 64b are of greater depth than is required to allow for the axial travel of piston 66b and each such cylinder has an auxiliary piston 67 disposed co-axially therein. Each auxiliary piston 67 is proportioned to abut an annular stop 68 within the associated cylinder when the auxiliary piston abuts the adjacent end of the primary piston 66b with the primary piston at the intermediate or centered position. Each cylinder 63b and 64b has a port 69 communicating with the interior of the cylinder between stop 68 and the adjacent end of primary piston 66b, and each has an additional port 71 communicating with the interior of the cylinder at the end remote from primary piston 66b. If ports 71 are unpressurized, shift fork 42b may be moved to either extreme position by venting one of the ports 69 while pressurizing the other thereof. With both ports 69 vented, the shift fork 42b may be moved to the centered or gear disengaging position and held thereat by pressurizing each of the ports 71. To provide a pressurized air signal on a sensing line 72 when the shift fork 42b has been shifted to either of the forward drive gear engaging positions, a double check valve 73 connects line 72 with pressure sensing ports 74 in the walls of each of the cylinders 63b and 64b, the pressure sensing ports being positioned to be exposed to the pressure action on primary piston 66b, only after the primary piston has substantially completed travel towards one of the extreme positions of the piston.

The reverse actuator 43c has a differing configuration inasmuch as the associated shift fork 42c does not require a centered position, but need only be shifted between a reverse drive disengaged position as depicted in FIG. 4 and a reverse drive engaged position at the other limit of shift fork travel. Actuator 43c has a pair of opposed, spaced apart cylinders 76c and 77c wherein cylinder 77c is of substantially greater diameter than cylinder 76c. A primary piston 78c has opposite ends of differing diameter, in order to extend into both cylinders 76c and 77c, and the associated shift fork 42c is secured to a central portion of the piston. Cylinder 77c has a port 79 through which pressurized air may be admitted to drive the piston 78c towards the position at which fork 42c abuts the other cylinder 76c and has a sensing signal port 81 positioned to receive pressurized air only after the piston has substantially completed such travel. The smaller diameter cylinder 76c is of greater depth than is required to accommodate the above described motion of the primary piston 78c and contains an auxiliary piston 82. Piston 82 is proportioned to abut an annular stop 83 within the cylinder 76c and the piston 78c when the shift fork 42c is abutted against cylinder 77c. A spring 84 is disposed within cylinder 76c to urge auxiliary piston 82 towards the above described position. A port 86 in cylinder 76c is positioned to provide for admission of pressurized air into the region between stop 83 and primary piston 78c to urge the primary piston in the direction of cylinder 77c and a sensing port 87 is located in the wall of cylinder 76c to receive pressurized air only after the primary piston 78c has carried shift fork 42c into abutment with cylinder 77c.

Port 86 is continually supplied with pressurized air to cause cylinder 76c to continually urge the primary piston 78c towards the reverse gear disengaged position depicted in FIG. 4. The function of auxiliary piston 82 and spring 84 is to hold the shift fork 42c at this position when the system is shut down and air pressure is absent. The actuator 43c may be shifted to engage reverse gear by admission of high pressure air to port 79 of cylinder 77c. As cylinder 77c has a greater diameter than cylinder 76c, the pressure acting within 77c is sufficient to overcome the opposed pressure acting within cylinder 76c combined with the opposed force of spring 84. Further, when fork 42c is shifted to the reversed disengaged position, a pressurized air signal is delivered to a sensing line 89 coupled to sensing port 87. Conversely, when the shift fork 42c is shifted to the reverse engaged position, a pressurized air signal is transmitted to another sensing line 88 communicated with sensing port 81.

Considering now the means for interlocking the actions of the two actuators 43b and 43c, actuator 43b is energized to shift fork 42b to the right as viewed in FIG. 4 by a temporary pressure signal on a pilot line 91 which pilots a two position valve 92 through a double check valve 93. Valve 92 is connected between actuator supply line 57 and port 69 and has an unpiloted position at which port 69 is vented, and a piloted position at which port 69 is communicated with the actuator supply line to shift fork 42b to the right as viewed in FIG. 4. A fluid line 94 is connected between port 69 and double check valve 93 to establish a holding circuit whereby valve 92 remains piloted, although the original pilot signal on line 91 may be terminated, until such time as the actuator supply line 57 is itself vented. Another two position pilot operated valve 96 is connected between actuator supply line 57 and port 69 of the other cylinder 64b and has an unpiloted position at which the actuator supply line is communicated with cylinder 64b to shift primary piston 66b and fork 42b leftwardly as viewed in FIG. 4. Valve 96 has a piloted position at which port 69 of cylinder 64b is vented to enable the shift fork 42b to be moved in the opposite direction as described above. A line 97 connects the pilot valve 96 with the pilot of valve 92 through a double check valve 98 to transmit a pilot signal to valve 96 whenever a pilot signal is present at valve 92. Accordingly, a fork 42b is shifted to abut cylinder 63b if actuator supply line 57 is pressurized in the absence of a pilot signal on pilot line 91. If a pilot signal is present on line 91 while actuator supply line 57 is pressurized, fork 42b is shifted to abut cylinder 64b unless such shifting of the fork is blocked by the interlock action.

As previously pointed out, reverse actuator 43c is normally shifted towards the reverse drive disengaged position of fork 42c by the constant pressurization of cylinder 76c and by the spring 84 therein. To selectively shift fork 42c to the reverse engaged position, an additional pair of two position pilot operated valves 99 and 101 are connected in series between actuator supply line 57 and port 79 of cylinder 77c. Valve 99 has an unpiloted position at which supply line 57 is communicated with a line 102 to valve 101 while valve 101 has an unpiloted position at which line 102 is blocked and port 79 of cylinder 77c is vented. A reverse pilot signal line 103 provides pilot pressure to valve 101 for causing a shift of fork 42c to the reverse engaged position, through a double check valve 104. To hold the valve 101 piloted after termination of such a pilot signal, a line 106 communicates the pilot of valve 101 with port 79 of cylinder 77c through double check valve 104. Thus, except under special conditions to be described, actuator 43c is held at the reverse disengaged position as actuator supply line 57 is pressurized unless a momentary pilot signal is present on line 103 at that time in which case the actuator 43c shifts to the reverse engaged position and is held at such position until such time as the supply line is de-pressurized.

Another double check valve 107 is connected between the pilot of valve 99 and both ports 69 of actuator 43b. If actuator 43b is energized to shift fork 42b away from the centered position in either direction, valve 99 is piloted to vent line 102 and thereby vent port 79 of reverse actuator 43c if it is not already vented. This prevents establishment of reverse drive if a forward drive is also being established at the same time by actuator 43b. Conversely, to lock actuator 43b in the centered or disengaged position if reverse drive has been initiated, a branched conduit 108 connects port 79 of actuator 43c with both ports 71 of actuator 43b so that both ports 71 are pressurized concurrently with pressurizing of port 79. Pressurizing of ports 71 causes the auxiliary pistons 67 of actuator 43b to center the fork 42b as previously described. This also requires releasing the pressure which might otherwise be present at port 69 of cylinder 64b. For this purpose, another line 109 interconnects the pilots of valves 101 and 96 through double check valve 98. Accordingly, if valve 101 is piloted to bring about reverse drive, valve 96 is also piloted to vent port 69 of cylinder 64b.

From the foregoing description of the actuators and actuator energizing circuits with reference to FIGS. 3 and 4, it may be seen that any selected shift of the change speed gears of the transmission may be realized by venting the actuator supply line 57 and then re-pressurizing the actuator supply line while transmitting temporary pilot pressure signals to predetermined ones of the pilot signal lines 61a, 61d and 61e, 91, 103 and 139 to determine which actuators undergo a shift and which do not.

Figure 5:
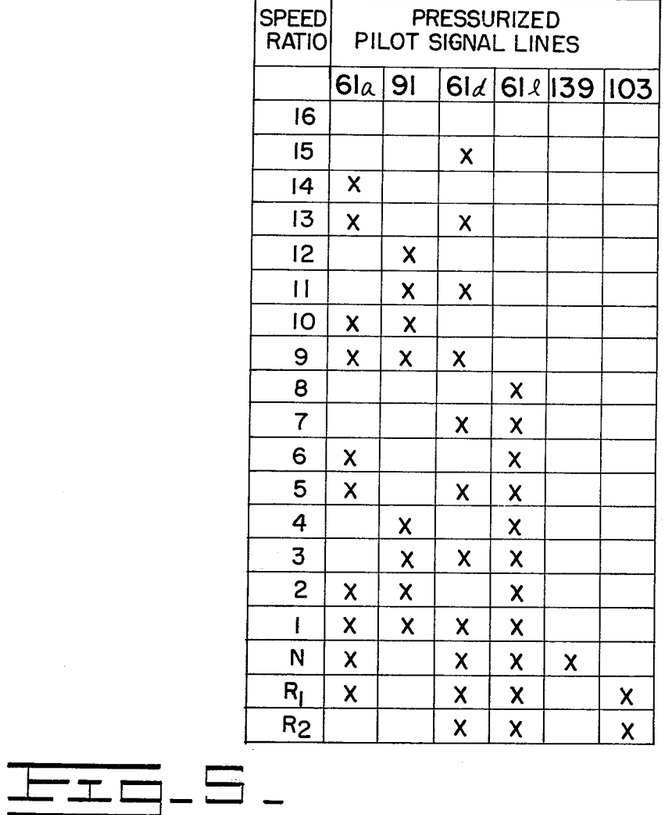
FIG. 5 is a chart illustrating which predetermined ones of certain fluid signal lines in the control system are pressurized in order to realize each of the possible speed ratios provided by the transmission.

FIG. 5 is a chart indicating which particular pilot signal lines 61, 91, 103 and 139 are pressurized to select each specific drive ratio in the particular transmission shown in FIG. 1.

Figure 2A:
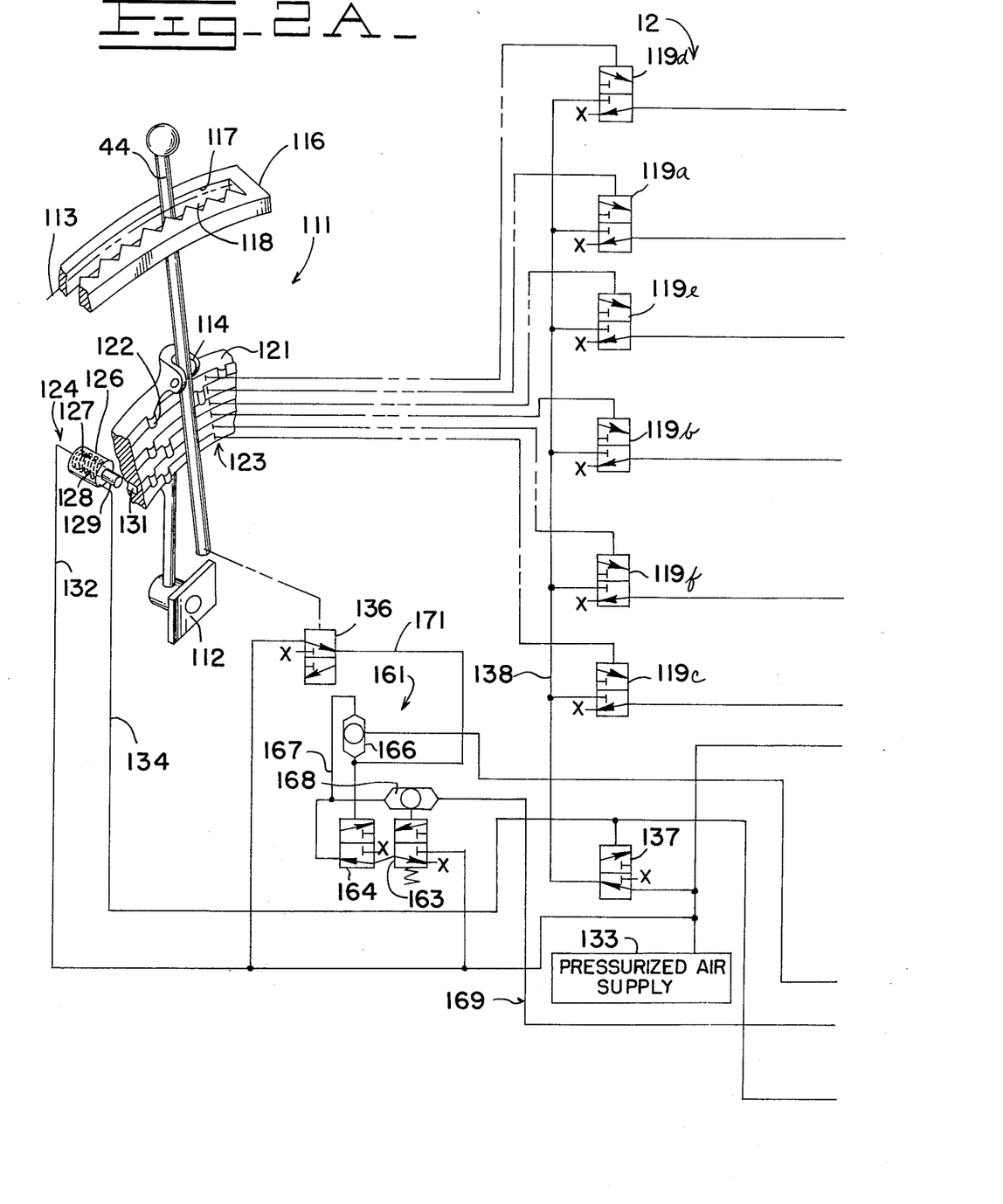
Figure 2B:
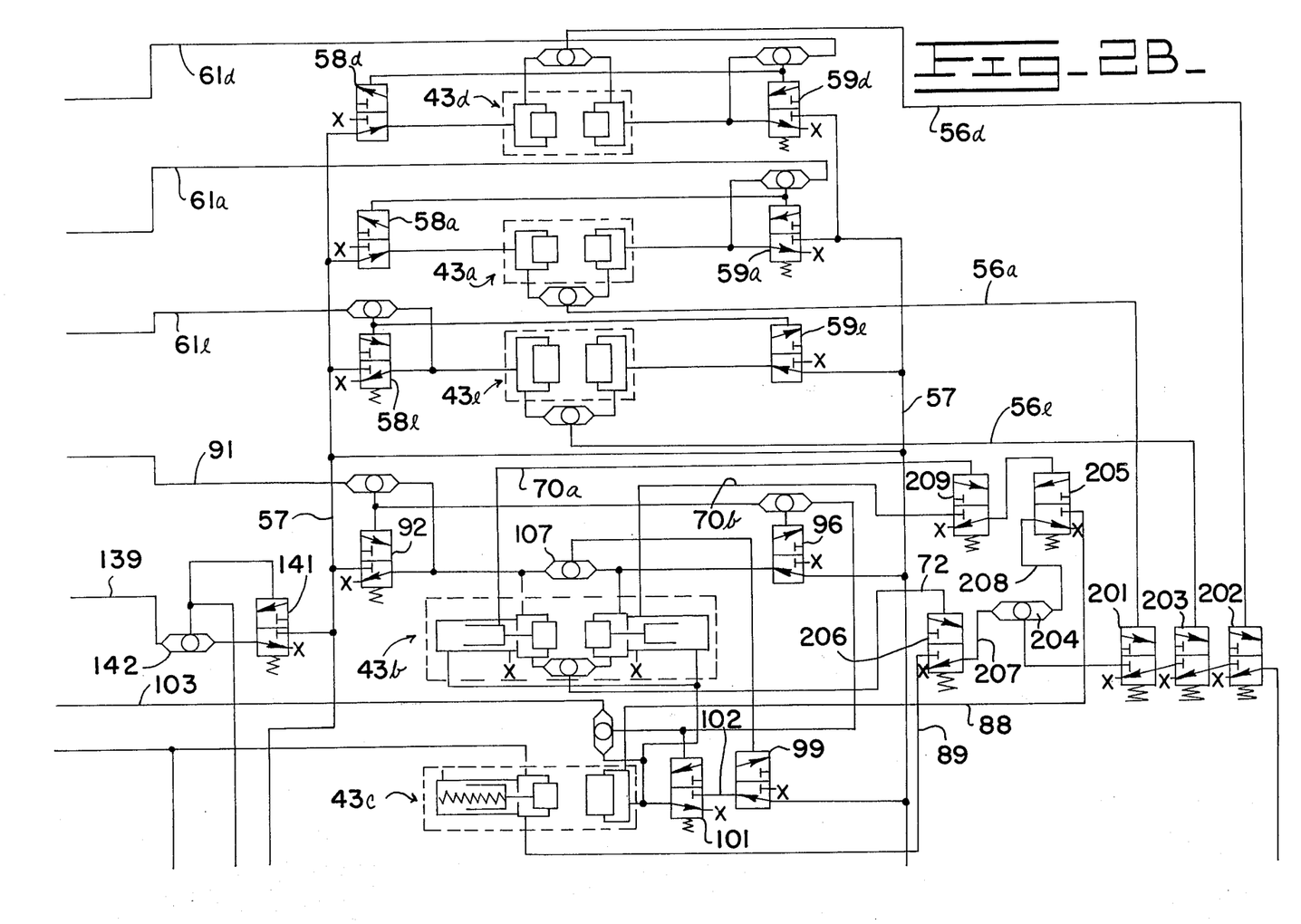
Figure 2C:
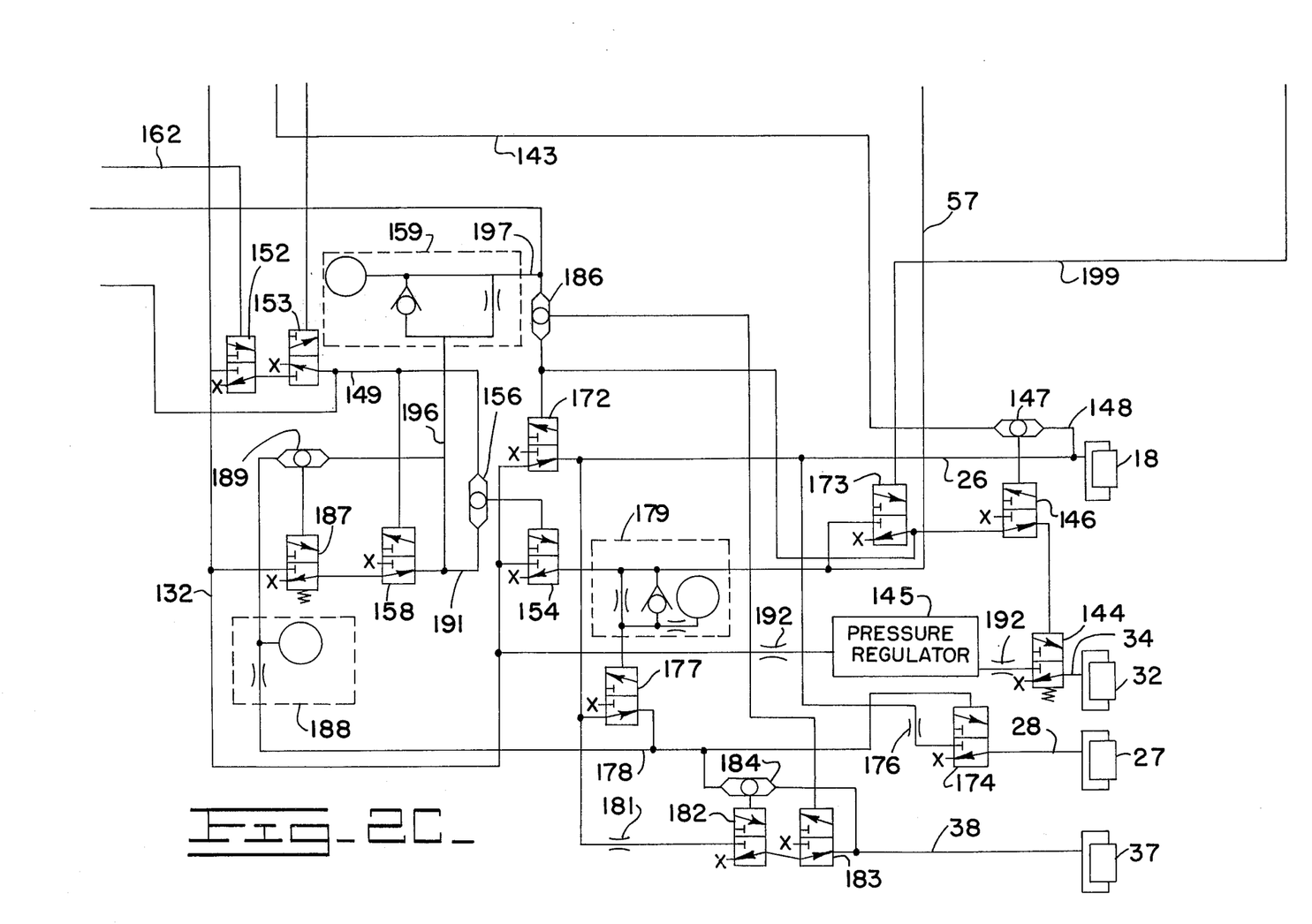
Figure 2D:
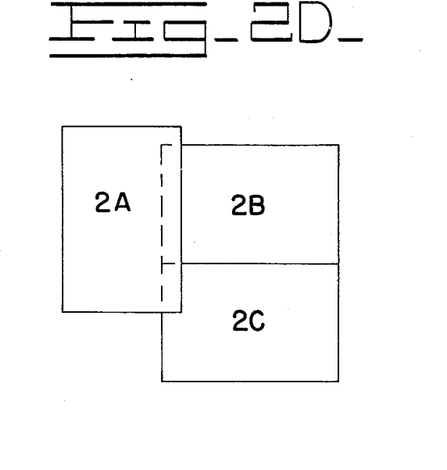

Considering now fluid circuit means for generating the necessary pressurized air signals to accomplish a selected shift in response to movement of the operator's control, reference should be made to FIGS. 2A, 2B and 2C in conjunction. The five actuators 43 and the above described actuator controlling circuit elements are again depicted together with the several pilot lines 61, 91 and 103 and actuator supply line 57. Again depicted in a more schematic form are the transmission input clutch 18, input brake 27, output clutch 32 and output brake 37 together with the control signal lines 26, 28, 34 and 38 respectively through which such elements are controlled by pressurized air. As has been previously described, shifting of the transmission in response to a movement of the operator's control lever 44 reduces to a matter of pressurizing and de-pressurizing predetermined ones of these fluid lines in a predetermined sequence.

A suitable detailed construction for the control lever assembly 111 is disclosed in prior U.S. Pat. No. 3,570,636 and another suitable construction is described in the hereinbefore identified co-pending U.S. application Ser. No. 372,331. Accordingly, elements of the control lever assembly 111 are shown only schematically in FIG. 2. The control lever 44 may be pivoted to a support 112 for fore and aft movement along an arc 113 to any of nineteen different positions, each of which corresponds to a different one of the sixteen possible forward speeds, neutral, or one of the two reverse speeds. Lever 44 also has an articulation 114 which enables the upper portion of the lever to be moved sidewardly from arc 113 at any of the nineteen positions. Preferably, the upper portion of the lever 44 extends through a shift quadrant plate 116 having a slot 117 defining arc 113 and having short notches 118 to accommodate to the short sideward movement of the lever away from the arc at any of the nineteen possible positions.

At each of the nineteen positions, control lever 44 mechanically pilots a different predetermined combination of six pilot valves 119a to 119f. A cam plate 121 is carried on the lower portion of the lever 44 below articulation 114 and has projections 122 positioned to pilot the predetermined ones of the valves 119 at each position of the lever through cam follower means 123.

To prevent movement of the lever 44 to initiate a shift, prior to completion of a previously initiated shift, locking means 124 are provided to block lever movement during the period that the control circuit 12 is completing a shift. Such means may consist of a cylinder 126 having a piston 127 slidable therein and urged away from cam plate 121 by a spring 128. A locking pin 129 is coupled to the piston 127 and extends axially from the cylinder in position to enter any of a plurality of bores 131 in cam plate 121 upon being extended from the cylinder against the action of spring 128, one of the bores 131 being located to be in alignment with the pin at each of the nineteen positions of the control lever. A line 132 connects the cylinder 126 with the pressurized air supply 133 to exert a continuous force on the piston tending to enter pin 129 into the adjacent one of the bores 131. Another line 134 communicates with the other end of the cylinder so that the control lever may be unlocked by admission of pressurized air to the other end of the cylinder to exert a retracting force on the piston 127 which, when combined with the force of spring 128, withdraws pin 129 from bores 131. Movement of the control lever 44 along the arc 113 to a newly selected position acts to condition pilot valves 119 to ready the system for a newly selected speed ratio but does not by itself initiate the actual shift. Initiation of the shift cycle is commenced by a subsequent sideward movement of the control lever 44 into the adjacent one of the notches 118. To sense movement of the control lever into and out of the notches 118, the sideward movement of the control lever mechanically pilots a two-position shift initiating valve 136. Shift initiating valve 136 in conjunction with other components to be described which respond to the piloting of valve 136 thus function as shift initiating means in this example of the invention.

Considering now actuator control means for shifting predetermined ones of the actuators 43 following disengagement of the input and output clutches, each of the pilot valves 119 is supplied with pressurized air from supply 133 through a two-position valve 137 in the unpiloted condition. Piloting of valve 137 vents the supply line 138 to pilot valves 119. The previously described actuator pilot signal lines 61a, 61b, 61e, 91 and 103 connect with pilot valves 119a, 119d, 119e, 119b and 119c respectively. Each pilot valve 119 has an unpiloted position at which the associated one of the actuator pilot lines is vented and a piloted position at which pressurized air supply line 138 is communicated with the associated actuator pilot line. Thus, different ones of the actuator pilot signal lines 61a, 61b, 61e, 91 and 103 are pressurized at different positions of the control lever 44 in accordance with FIG. 5.

Referring again to FIGS. 2A, 2B and 2C in conjunction, additional pilot valve 119f is piloted by cam plate 121 only at the neutral position of the control lever. At the piloted position, valve 119f connects a neutral signal line 139 with pressurized air line 138 while venting the neutral signal line 139 when in an unpiloted condition. Neutral is established in the present transmission by disengaging the output clutch 32. Neutral signal line 139 is communicated with the pilot of a two-position neutral valve 141 through a double check valve 142 and with a clutch disengage signal conduit 143 through the same check valve. Valve 141 has a piloted position at which pressurized air is also supplied to check valve 142 from actuator supply conduit 57 and has an unpiloted position at which the connection to check valve 142 is vented. Accordingly, valve 141 acts as holding circuit to maintain the clutch disengage signal conduit 143 pressurized, once it has been initially pressurized by a temporary pilot signal from pilot valve 119f, until such time as the actuator supply line 57 may be exhausted. Engagement and disengagement of the output clutch 32 is controlled by a two-position valve 144 having an unpiloted position at which clutch control conduit 34 is vented and having a piloted position at which control conduit 34 is pressurized with air derived through a pressure regulator 145 as will hereinafter be described in more detail. Valve 144 is in turn controlled by another two-positioned valve 146. Valve 146 has a piloted position at which the pilot of valve 144 is vented thereby venting output clutch control conduit 34 and disengaging the output clutch to establish neutral within the transmission. Valve 146 is itself piloted for this purpose by the pressure within clutch disengage signal line 143 as obtained through a double check valve 147. The pilot of valve 146 is also connected to input clutch control signal conduit 26 through double check valve 147 and a line 148 so that the output clutch 32 is also disengaged whenever the input clutch is disengaged.

During the periods when a previous shift has been completed and a new one has not yet been initiated, with the shift lever 44 in one of the notches 118, actuator supply line 57 is held pressurized, while pilot valve supply line 138 is vented. Line 134 to locking means 124 is pressurized to release the control lever for the next shift. None of these conditions are changed by a subsequent movement of the control lever 44 out of a notch 118 and then along arc 113 for the purpose of selecting a new speed ratio. These conditions change only when the control lever 44 is then again moved sidewardly from arc 113 into a newly selected notch 118. This last movement temporarily restores pressure to pilot valve supply line 138 while momentarily depressurizing and then re-pressurizing the actuator supply line 57 to cause the actuators 43 to shift as necessary to realize the newly selected gear ratio in the manner hereinbefore described.

Cycling of the system to effect a shift is initiated by venting of a control line 149. During the periods between shifts, line 149 receives air from supply 133 through air conduit 132, a two-position pilot operated valve 152 and another two position pilot operated valve 153. At such times, valve 152 is held piloted by means to be hereinafter described to transmit air from conduit 132 to valve 153. Valve 153 is also held piloted, by pressure from actuator supply line 57, and transmits air to the control line 149. The shift lever locking means 124 is held retracted, in preparation for a subsequent shift, as line 134 to the locking means connects with control line 149. Valve 137 is also held piloted by the pressure in line 134 to vent the pilot valve supply line 138. The pressure within control line 149 also pilots another valve 154 through a double check valve 156 to supply pressurized air from conduit 132 to actuator supply line 57. In addition, line 149 pressure pilots another valve 158 to exhaust and reset a timer 159. Timer 159 functions as a timer means for restoring line 149 to the pressurized or first state a predetermined time after the change from the first state to the second or unpressurized state.

During the intervals between shifts, a pilot signal is applied to valve 152 to maintain control line 149 pressurized. This pilot signal is provided by a holding circuit 161 which transmits pressurized air to the pilot of valve 152 through a pilot line 162. During the periods between shifts, pilot line 162 receives pressurized air through a valve 163, another valve 164, and a double check valve 166. At such times, valve 163 is held piloted to transmit air from supply 133 to valve 164 since the output line 167 from valve 164 is connected back to the pilot of valve 163 through a double check valve 168. Valve 163 was initially piloted to this position by air received from timer 159 through a line 169 which also connects with the pilot of valve 163 through check valve 168. The previously described shift-initiating valve 136, which is operated by sideward movement of the operator's control lever 44, applies pressure to a line 171 when the control lever is shifted out of a notch 118 and onto arc 113 while venting line 171 when the control lever is shifted away from the arc and back into a notch. Accordingly, receipt of a pressure signal from timer 159 at the conclusion of a shift as will hereinafter be described pilots valve 163 to apply pressure from supply 133 to line 162 through valve 164, line 167 and double check valve 166. Although the signal from the timer terminates as will hereinafter be described, valve 163 is subsequently held piloted by pressure transmitted through valve 164. Valve 164 and coacting elements thus function as a means for maintaining the control fluid line 149 in a first pressure state independently of timer means 159 while the drive ratio selector member is at a first path which is defined by arc 113 in this example of the invention. Line 171 connects with the pilot of valve 164 and also with line 162 through check valve 166. Thus, line 162 continues to be pressurized when the control lever 44 is subsequently moved onto arc 113, although valve 164 is thereby piloted to vent line 167. In effect, control of the pressure in line 162 is taken over by the shift initiating valve 136 from the valves 163 and 164 once the operator's control lever has been moved onto arc 113. When the control lever is subsequently moved back into a notch 118, indicating that a new gear ratio has been selected, shift initiating valve vents line 171. Line 162 is thereby depressurized and cycle control valve 152 is unpiloted, depressurizing the control line 149 to begin a shift cycle. These elements, such as 171, 162 and 152 thus function in this example of the invention as components of a means for changing the pressure in fluid line 149 from the first or pressurized state to the second or unpressurized state in response to movement of a drive ratio selector member away from a first path of travel.

To facilitate understanding of the cycling of components as initiated by the depressurization of control line 149, circuit elements which control the input and output of the transmission will first be described. A two-position pilot operated valve 172 is connected between air conduit 132 and input clutch control conduit 26. Valve 172 has an unpiloted position at which pressurized air is supplied to the input clutch to disengage the clutch as previously described and has a piloted position at which the conduit 26 is vented and the clutch is therefore engaged. To supply pilot pressure to valve 172, another valve 173 is connected between the pilot of valve 172 and air conduit 132 through the previously described actuator supply line valve 154. Valve 173 has an unpiloted position which vents the pilot of valve 172 and has a piloted position at which valve 172 is piloted to engage the front clutch. Valve 173 is itself piloted by means to be hereinafter described.

Pressurizing of conduit 26 to disengage the input clutch 18 also pilots the valve 146 to vent the pilot of valve 144 which is then unpiloted to vent and disengage the output clutch. In the unpiloted condition, valve 146 receives pressurized air for piloting valve 144 through the above-described valve 173.

Considering now means for applying the input brake 27 as the input and output clutches are disengaged, control two-position pilot actuated valve 174 is piloted to transmit pressurized air from valve 172 to front brake control conduit 28 through a flow restriction 176. In the unpiloted condition, valve 174 vents conduit 28 to release the input brake. The pilot signal for valve 174 is obtained through valve 172 and through an additional two-position pilot operated valve 177 which is in an unpiloted condition at the time that the input brake is applied. Valve 177 is itself piloted, to vent the line 178 to the pilot of valve 174, by air received from actuator supply line 57 through a timer 179. Control conduit 38 is pressurized to apply the output brake 37 by air received through valve 172 and a flow restriction 181, a two-position pilot operated valve 182 and another two-position pilot operated valve 183. Valve 182 is piloted to transmit such pressurized air to valve 183 by a pilot connection to line 178 through a double check valve 184 and has an unpiloted position at which the output brake control conduit 38 may be vented. Valve 183 has a pilot connection to the pilot of valve 172 and also to the output of timer 150 through a double check valve 186. Upon being piloted, valve 183 shifts to vent control conduit 38 and thereby releases the output brake 37.

Still another two-position pilot operated valve 187 is connected between air conduit 132 and the previously described valve 158 and has a piloted position at which air is applied to the pilot of actuator supply valve 154 through valve 158 and check valve 156. In the unpiloted position, valve 187 vents valve 158. Valve 187 is connected to receive pilot pressure from line 178 through a delay circuit 188 and a double check valve 189. Valve 187 is held piloted after depressurization of line 178 as the line 191 from valve 158 to check valve 156 is connected back to the pilot of valve 187 through the double check valve 189.

Considering now the sequence of operations which is initiated as a result of the temporary depressurizing of the control line 149 by movement of the control lever 44 into a notch 118 as hereinbefore described, it has been pointed out that such action unpilots valve 137 to resupply pressure to the pilot valve actuator line 138 and operates the shift lever locking means 124 and also unpilots valve 154 to momentarily exhaust the actuator supply line 57. This venting of the actuator supply line removes pilot pressure from valve 172 which then shifts to disengage the input clutch 18 by pressurizing control line 26. This in turn pilots valve 146 to unpilot valve 144 and thereby disengages the output clutch 32. This also applies engagement pressure to input brake 27 through valve 174 and flow restriction 176.

Timer 179 holds valve 177 piloted for a predetermined brief period of time after venting of actuator supply line 57 to delay application of the input and output brakes as disengagement of the input and output clutches commences. At the expiration of this delay, valve 177 is unpiloted and transmits pilot pressure to valve 174 which then shifts to transmit engagement pressure, modulated by flow restriction 176, to input brake 27. Unpiloting of valve 177 also transmits pilot pressure to valve 182 which then shifts to transmit engagement pressure, modulated by flow restriction 181, to output brake 37 through valve 183. These actions results in a temporary stopping of rotation of the change speed gears within the transmission.

The unpiloting of valve 177 also pressureizes line 178 and this results in a delayed pilot pressure being applied to valve 187 through delay 188 and check valve 189. Upon being piloted, valve 187 reapplies pilot pressure to the actuator supply valve 154 which then repressurizes the actuator supply line 57.

Considering now the shift concluding means in this example of the invention, repressurization causes the actuators 43 to shift in the manner hereinbefore described to accomplish the newly selected gear engagements as determined by the presence or absence of pressure in pilot signal lines 61, 91 and 103. Should any of these gear engagements not be completed because of the abutment of gear teeth or other causes, or if directional gears should not disengage as necessary to avoid contradictory drive directions, a special contingency sequence of operations is initiated as will hereinafter be described, but it will be assumed for the present that all necessary gears disengagements and re-engagements proceed without difficulty. Under that condition, the repressurization of the actutor supply line 57 reapplies pilot pressure to valve 172 through valve 173. This vents input clutch control signal conduit 26 conditioning the input clutch to re-engage in the presence of sufficient engine speed and also removes pilot pressure from valve 146 which then repressurizes pilot valve 144 to repressurize and engage output clutch 32. Flow restrictions 192 at the input and output of the pressure regulator 146 assure that the output clutch engages slightly after the input clutch. Considering now means for releasing the input and output brakes 27 and 37 as the input and output clutches 18 and 32 are re-engaged, the repressurization of actuator supply line 57 also pilots valve 177, unpiloting valve 174 through line 178 releasing the input brake 27 by venting control conduit 28 through valve 174 and flow restriction 176. The output brake 37 is also released as the pilot signal which is transmitted to valve 172 is also transmitted to valve 183 through double-check valve 186 to vent output brake control conduit 38.

The re-application of pilot pressure to actuator supply valve 154 which initiated the sequence of events described immediately above also applied pressurized air to the input 196 of timer 159. After a predetermined period of time, a pressure signal at the output 197 of the timer pilots valve 163 of the holding circuit 161 through line 169 and is also transmitted to the pilot valve 183 through check valve 186 for purposes to be hereinafter described. The piloting of holding circuit valve 163 repressurizes pilot signal line 162 through valves 164, line 167, and check valve 166. Valve 163 is then held in the piloted condition by the feedback of pressure from valve 164 to the pilot of valve 163 through check valve 168. This repressurization of pilot line 162 pilots valve 152 to reapply pressure to valve 153. As valve 153 was itself repiloted by the repressurization of actuator supply line 57, this results in repressurization of the control signal line 149 thereby restoring the circuit to the condition which existed prior to the initiation of the shift.

In the above description of the cycling of the system to accomplish a shift, it was pointed out that valve 172 was unpiloted at the beginning of the shift to directly or indirectly initiate disengagement of the input and output clutches and engagement of the brakes. The subsequent repiloting of valve 172 to restore the clutches and brakes to the original conditions at the conclusion of the shift was conditional on valve 173 being piloted as the pilot pressure for valve 172 is obtained through valve 173. Thus it is the piloting of valve 173 by pressurized air received through a sensing line 199 which determines the timing of the conclusion of the shift. Line 199 is pressurized for this purpose only when all gear engagements are completed and only in the absence of simultaneous engagement of both forward and reverse drive establishing gears.

Considering now the sensing means which pressurizes sensing line 199 for this purpose, it has been previously pointed out that actuators 43a, 43d and 43e have engagement signal lines 56a, 56d and 56e respectively which become pressurized only when the associated actuator is at one of the extreme positions indicating that a desired gear engagement has been realized. Each such signal line 56a, 56d, and 56e supplies pilot pressure to an individual one of three two-position valves 201, 202 and 203 respectively. Sensing line 199 receives air through a double check valve 204 and the valves 201, 202 and 203 are disposed between valve 204 and line 199 in a disposition where each of the three valves must be piloted in order for such air, which constitutes a first signal to be transmitted to the sensing line 199. Each of the valves 201, 202 and 203 has an unpiloted position at which sensing line 199 is vented. Accordingly, the sensing line 199 cannot be pressurized to permit conclusion of a shift unless each of the three actuators 43a, 43d and 43e has completed a gear engagement.

It has also been pointed out that the remaining two actuators 43b and 43c have a more complex sensing signal system wherein a line 72 is pressurized to produce a second fluid pressure signal when actuator 43b has shifted in either direction sufficient to engage forward drive gears while lines 70a and 70b are both pressurized to produce a third fluid pressure signal when the actuator has been shifted to the centered position at which forward drive through the transmission cannot be established. Similarly, the signal line 88 is pressurized to produce a fourth fluid pressure signal when actuator 43c has shifted to establish reverse drive while a line 89 is pressurized to produce a fifth fluid pressure signal when actuator 43c is shifted to disengage the reverse drive gearing. These several engagement and disengagement signal lines determine whether or not air is supplied to double check valve 204 for transmission to sensing line 199 through valves 201, 202 and 203 and function, in this example of the invention, as elements of means for suppressing the first signal if the forward drive and reverse drive actuators are both at gear coupling positions.

For this purpose, a two-position pilot operated valve 206 may receive air from signal line 89 and transmits such air to valve 204 when in the piloted condition, the valve 206 acting to vent the flow path 207 to valve 204 when in the unpiloted condition. Signal line 72 is coupled to valve 206 to supply pilot pressure thereto. Line 89 receives air through actuator 43c only when the actuator is shifted to disengage the reverse gears. Line 72 receives air through actuator 43b only if that actuator has shifted in either direction sufficiently to establish one of the forward drive gear couplings controlled thereby. Therefore, valve 206 supplies air to double check valve 204 only if a foward drive gear coupling has been accomplished and there is no reverse drive gear engagement present. If valves 201, 202 and 203 are each piloted at that time by sixth fluid pressure signals received through lines 56a, 56d and 56e as previously described indicating that actuators 43a, 43d and 43e have also completed gear engagements, then pressure is transmitted to sensing line 199 to permit the conclusion of a shift cycle.

To enable the system to conclude a shift when a forward to reverse drive shift is being made, another two-position pilot operated valve 205 has a piloted position at which signal line 88 is coupled to a line 208 to the other side of double check valve 204 when in the piloted condition. Valve 205 vents line 208 when unpiloted. Valve 205 is piloted through another two-position valve 209 by air from signal line 70b, the valve 209 having an unpiloted position at which the pilot of valve 205 is vented. Pilot pressure for valve 209 is provided by signal line 70a. Analyzing these connections, it may be seen that double check valve 204 receives pressurized air through line 208 only if actuator 43b has been shifted to the centered position while actuator 43c has been shifted to the reverse gear engaged position. Under that condition and provided that valves 201, 202 and 203 have also each been piloted, air is again supplied to sensing line 199 to enable completion of a shift.

Valve 173 and associated components function as a means connected between the sensing means and the shift concluding means for blocking operation of the shift concluding means in the absence of the first signal on sensing line 199. It may be seen that the valve 173 is piloted to permit completion of the shift cycle only after all actuators 43 have completed the required gear engagement and only if a reverse gear engagement has been accompanied by a disengagement of forward drive or vice versa. If these actions do not occur within a predetermined period determined by timers 159 and 179, the system automatically initiates actions to assist the actuators to overcome any tooth abutments, torque locking or the like which may be interfering with the desired engagement and disengagements. In particular, after a period normally sufficient to complete necessary gear disengagements, input brake 27 is released as the pilot pressure at valve 177 is reapplied through first timer means such as timer 179 and the unpiloting of valve 177 in turn unpilots valve 174. A nominally disengaged clutch such as the input clutch 18 transmits a small amount of torque if not braked. The release of the input brake allows this drag torque to lightly turn the change speed gears and with the output brake still engaged this results in relative rotation between any abutted gear teeth enabling necessary engagements to be completed. Should this not result in pressurization of the sensing line 199 to permit completion of the shift as described above, still another corrective step is automatically initiated. An output signal is produced by second timer means such as timer 159 which, through check valve 186, pilots valve 183 to release the output brake 37. With both brakes now released, the relatively small drag torque transmitted through both disengaged clutches 18 and 32 accelerates the change speed gear section, at both ends of the transmission. This action reduces the torque exerted across any adjacent gears that may be torque locked in partial engagement so that the associated actuator can disengage such gears. This also reduces the speed differential between any gears which have failed to engage to enable the associated actuators to complete the desired engagement. When the necessary engagements and disengagements have been completed, sensing line 199 is pressurized to pilot valve 173. The shift cycle then proceeds to completion as previously described.

While the invention has been described with respect to a single preferred embodiment, it will be apparent that many variations are possible and it is not intended to limit the invention except as defined in the following claims.

What is claimed is:

1. A control system for a transmission which has an input clutch and an output clutch and a plurality of change speed gears to provide for a plurality of drive ratios therebetween, comprising:

a movable drive ratio selector member having a plurality of positions each corresponding to a separate one of said drive ratios, a plurality of fluid pressure operated actuators each being shiftable between at least two predetermined positions to couple and decouple predetermined ones of said change speed gears, shift initiating means for disengaging said input and output clutches in response to movement of said selector member to a newly selected one of said positions thereof, actuator control means for shifting predetermined ones of said actuators between said positions thereof following said disengagement of said input and output clutches, sensing means for producing a first signal when each of said plurality of actuators is at one of said predetermined positions thereof, shift concluding means for re-engaging said input and output clutches following operation of said actuator control means, and means connected between said sensing means and said shift concluding means for blocking operation of said shift concluding means to block re-engagement of both said input clutch and said output clutch in the absence of said first signal.

2. The combination defined in claim 1 further comprising:

a first rotatable element for transmitting power from said input clutch to said change speed gears and a second rotatable element for transmitting power from said change speed gears to said output clutch, input brake means for stopping rotation of said first rotatable element and output brake means for stopping rotation of said second rotatable element, said shift initiating means having means for applying said brakes as said clutches are disengaged and said shift concluding means having means for releasing said brakes as said clutches are re-engaged, first timer means for releasing one of said brakes independently of said shift concluding means after a first predetermined interval, and second timer means for releasing the other of said brakes independently of said shift concluding means after a second predetermined interval which is longer than said first predetermined interval.

3. The combination defined in claim 1 wherein said plurality of acutators include a forward drive actuator having at least one gear coupling position at which forward drive is established through said change speed gears and having a gear decoupling position at which said forward drive is interrupted, said plurality of actuators further including a reverse drive actuator having a gear coupling position at which reverse drive is established through said change speed gears and having a gear decoupling position at which said reverse drive is interrupted, and wherein said sensing means includes means for suppressing said first signal if said forward drive and said reverse drive actuators are both at said gear coupling positions thereof.

4. The combination defined in claim 3 wherein said forward drive actuator has means for producing a second fluid pressure signal when at said gear coupling position and for producing a third fluid pressure signal when at said gear decoupling position thereof and wherein said reverse drive actuator has means for producing a fourth fluid pressure signal when at said gear coupling position thereof, and for producing a fifth fluid pressure signal when at said gear decoupling position thereof, and wherein said sensing means has means for generating said first signal if said second signal is concurrent with said fifth fluid pressure signal while said fourth signal is absent and also if said third signal and said fourth signal are concurrent while said second signal is absent.

5. The combination defined in claim 4 wherein the remaining ones of said plurality of actuators each have means producing sixth fluid pressure signals when at either of said two predetermined positions thereof, and wherein said means connected between said sensing means and said shift concluding means comprises valve means for transmitting said first signal only in the presence of simultaneous sixth signals from each of said remaining ones of said actuators.

6. The combination defined in claim 1 further comprising fluid pressure controlled means for locking said drive ratio selector member against movement between said positions thereof, and wherein said shift initiating means has means for engaging said locking means as said clutches are being disengaged, and wherein said shift concluding means has means for releasing said locking means.

7. The combination defined in claim 1 wherein said shift initiating means has a fluid line in which fluid pressure is changed for a first state to a second state in response to movement of said drive ratio selector member to a newly selected one of said positions thereof and has means for disengaging said input and output clutches and for energizing said actuator control means in response to said change of said pressure in said fluid line from said first state to said second state, and has timer means for restoring said fluid line to said first state a predetermined time after said change of said fluid line from said first state to said second state whereby said control system is conditioned to respond to a subsequent movement of said drive ratio selector member in advance of said subsequent movement.

8. The combination defined in claim 7 wherein said drive ratio selector member is movable along a first path of travel extending past each of said plurality of positions thereof and is also movable away from said path and towards said path at each of said plurality of positions thereof, said shift initiating means having means for changing said pressure in said fluid line from said first state to said second state in response to said movement of said member away from said first path thereof at any of said plurality of positions whereby shifting of said transmission is initiated by said movement of said member away from said first path thereof, wherein said timer means for restoring said fluid line from said second state to said first state further comprises a fluid holding circuit supplying a predetermined pressure to said fluid line following a shift of said transmission while said drive ratio selector member remains away from said first path thereof, and means for disconnecting said holding circuit from said fluid line upon subsequent movement of said selector member onto said first path thereof while continuing to maintain said fluid line in said first state while said selector member remains at said first path thereof.

9. The combination defined in claim 8 wherein said actuator control means comprises a plurality of pilot signal valves each being communicated with a separate one of said plurality of actuators for transmitting a pilot signal thereto to condition the associated one of said actuators to undergo a predetermined shift between positions thereof, means for operating a different combination of said pilot valves at each of said plurality of positions of said selector member, a source of pilot fluid pressure coupled to each of said pilot signal valves, a pilot fluid pressure valve connected between said source and each of said pilot signal valves, and means for closing said pilot fluid pressure valve while said fluid line is at said first pressure state thereof and for opening said pilot fluid pressure valve when said fluid line is changed from first to said second pressure state thereof.

10. A control system for a transmission which has an input clutch and an output clutch and a plurality of change speed gears to provide for a plurality of drive ratios therebetween, comprising:

a drive ratio selector member movable between a plurality of positions each corresponding to a separate one of said drive ratios, a shift initiating valve coupled to said selector member to be operated thereby upon movement of said selector member into any of said positions thereof, a plurality of fluid pressure operated actuators each being shiftable to couple and decouple predetermined ones of said change speed gears, fluid circuit means for disengaging said input and output clutches in response to said operation of said shift initiating valve and for energizing predetermined ones of said actuators to shift between said positions thereof as determined by the position of said selector member and for subsequently re-engaging said clutches to re-establish drive through said transmission, said fluid circuit means having a control line which is shifted from a first pressure state to a second pressure state in response to said operation of said shift initiating valve wherein said change to said second pressure state initiates said operations of said fluid circuit means, and means including a timer for rechanging said control fluid line from said second pressure state to said first pressure state a predetermined time after said control fluid line is changed from said first state to said second state whereby said system is readied to respond to a subsequent additional movement of said selector member prior to said subsequent additional movement thereof.

11. The combination defined in claim 10 wherein said drive ratio selector member is movable along a first path extending past each of said positions thereof and is movable away from said path into any selected one of said positions and wherein said movement away from said path operates said shift initiating valve, further comprising means for maintaining said control fluid line in said first pressure state thereof independently of said timer means while said selector member is at said first path thereof.

12. The combination defined in claim 11 further comprising a locking element for blocking movement of said selector member between said positions thereof, means for applying said locking element in response to change of said control fluid line from said first pressure state to said second pressure state thereof, and means for releasing said locking element in response to a subsequent change of said control fluid line from said second pressure state to said first pressure state thereof.

* * * * *